Nov. 5, 1957 P. H. DIXON 2,811,902
MECHANICAL BOLT UNLOCKING MECHANISM FOR RECOILING BARREL GUNS
Filed Jan. 18, 1952 3 Sheets-Sheet 1
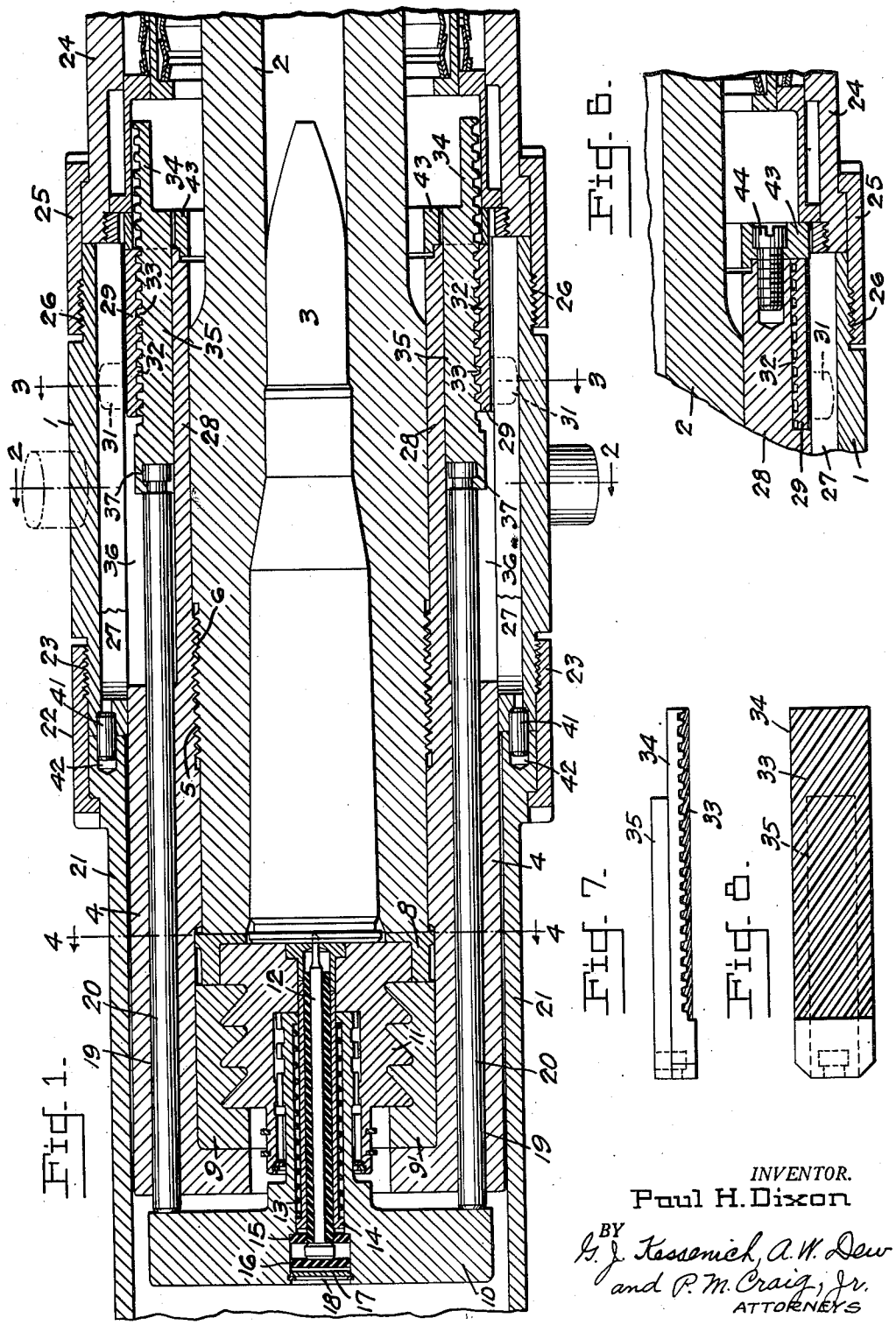
INVENTOR.
Paul H. Dixon

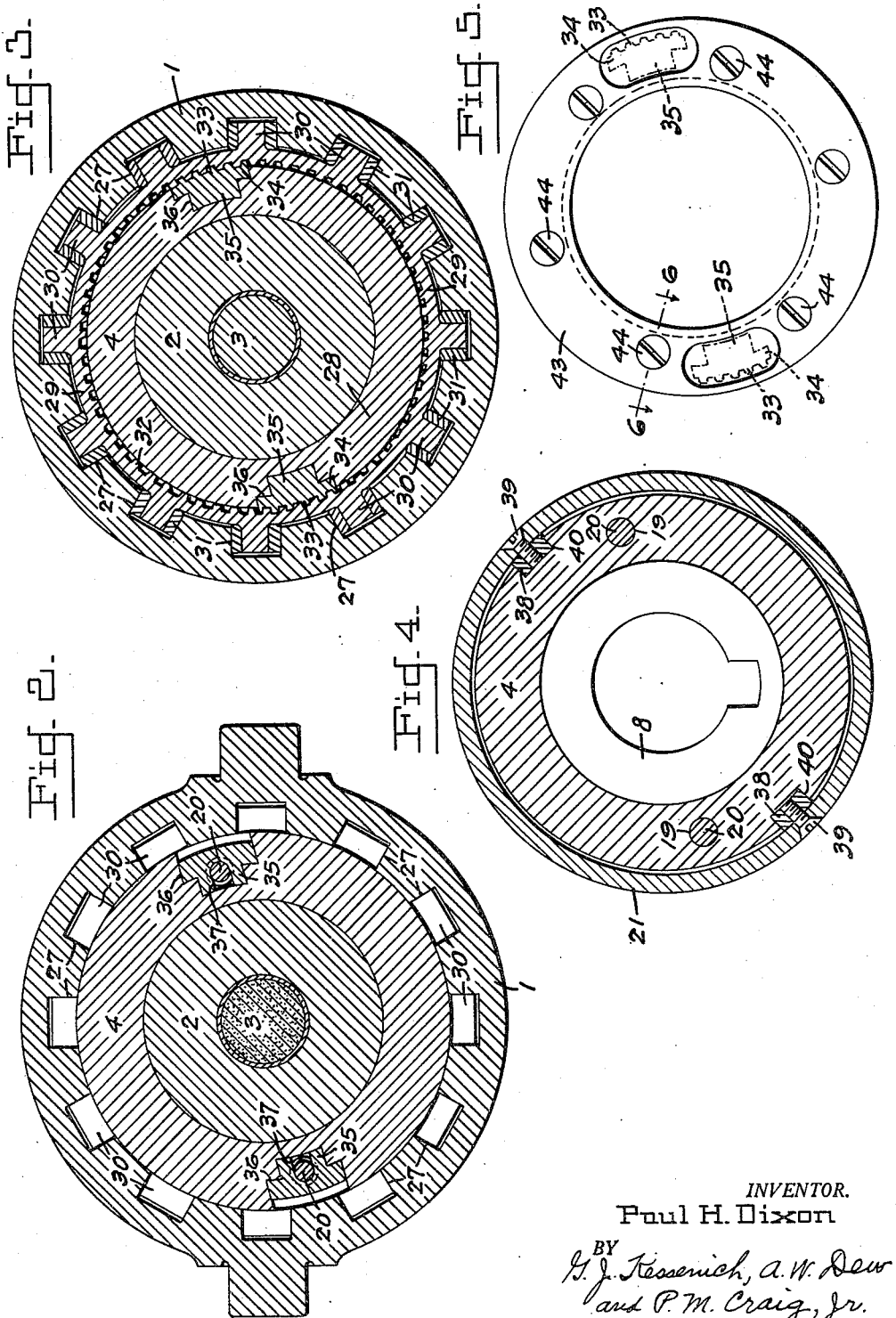

Nov. 5, 1957 P. H. DIXON 2,811,902
MECHANICAL BOLT UNLOCKING MECHANISM FOR RECOILING BARREL GUNS
Filed Jan. 18, 1952 3 Sheets-Sheet 3
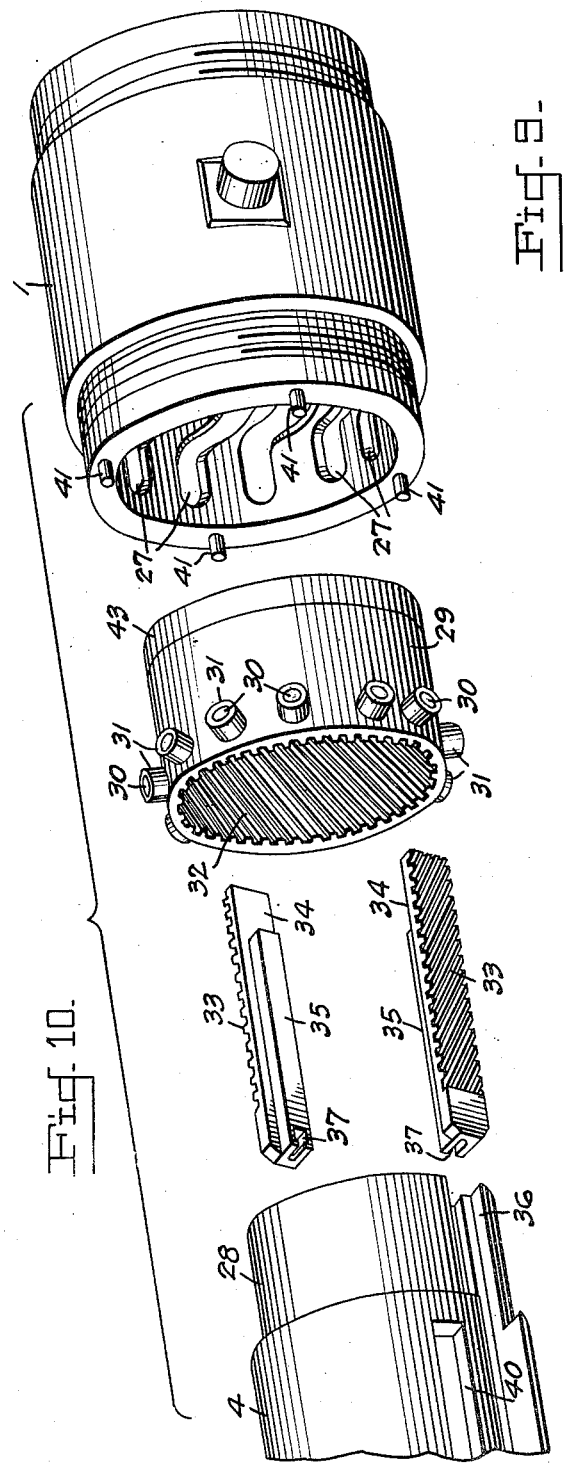
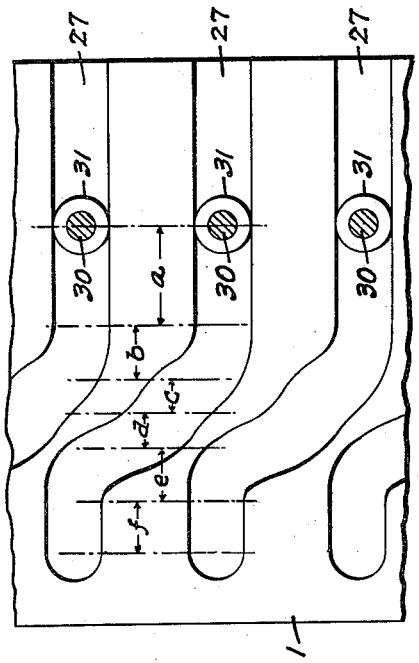
INVENTOR.
Paul H. Dixon United States Patent Office 2,811,902
Patented Nov. 5, 1957

2,811,902

MECHANICAL BOLT UNLOCKING MECHANISM FOR RECOILING BARREL GUNS

Paul H. Dixon, Rockford, Ill., assignor to the United States of America as represented by the Secretary of the Army Application January 18, 1952, Serial No. 267,132

11 Claims. (Cl. 89—165)

This invention relates to an automatic cannon and more particularly to a mechanical bolt operating mechanism.

More specifically the present invention relates to a bolt operating mechanism, which is entirely mechanical, and wherein the recoil motion of the gun is utilized to provide mechanical unlocking and acceleration of the bolt by converting the recoil motion to the desired bolt motion by means of a multiple cam and helical gear, which serve as a motion timing device and linear-to-rotary motion converting device respectively.

It is accordingly an object of the present invention to provide a bolt operating mechanism which is entirely mechanical.

Another object of the present invention is to provide a bolt operating mechanism which utilizes the recoil of the gun to unlock and accelerate the bolt.

A still further object of the present invention is to provide a mechanical bolt operating mechanism wherein the linear recoil motion is converted into rotary motion by means of a multiple cam coacting with a helical gear in the trunnion ring, the latter serving as a motion timing device, and wherein the rotary motion is reconverted into linear unlocking motion by means of helical gear connections between the cam follower and the actuator racks.

Another object of the present invention resides in a mechanical bolt operating mechanism the operation of which is properly timed so as to provide an initial delay in the operation thereof to permit sufficient dissipation of the gun tube chamber pressure thereby avoiding critical stresses, and to complete the unlocking operation when the gun tube chamber pressure is negligible thereby assuring complete mechanical control of the bolt during final acceleration.

A still further object of the present invention is to provide a mechanical bolt operating mechanism which momentarily decelerates the actuator rods just prior to the bolt unlocking, so that the bolt body continues to recoil under its own momentum and thereby separates from the actuator rods, and which after completion of the unlocking again accelerates the actuator rods so as to accelerate the bolt assembly.

Another object of the present invention is to provide a mechanical bolt operating mechanism wherein the loads induced by acceleration are distributed in such manner as to minimize the stress peaks in the mechanism and the impact load on the bolt head when it is picked up after unlocking.

The specific nature of the invention as well as other objects and advantages thereof will be obvious from the following description taken in connection with the accompanying drawings which show for purposes of illustration only one specific embodiment of this invention and wherein:

Figure 1 shows a horizontal cross sectional view of the bolt operating mechanism in accordance with the present invention;

Figure 2 shows a vertical, cross sectional view of the bolt operating mechanism in accordance with the present invention taken along lines 2—2 of Figure 1;

Figure 3 shows a vertical, cross sectional view of the bolt operating mechanism in accordance with the present invention taken along lines 3—3 of Figure 1;

Figure 4 shows a vertical, cross sectional view of the bolt operating mechanism in accordance with the present invention taken along lines 4—4 of Figure 1;

Figure 5 shows an end view of the retainer ring;

Figure 6 is a partial cross sectional view taken along lines 6—6 of Figure 5;

Figure 7 is a side-elevational view of one of the actuator racks in accordance with the present invention;

Figure 8 is a bottom view of the actuator rack shown in Figure 7;

Figure 9 illustrates the particular shape of the multiple cams in the trunnion ring;

Figure 10 is a perspective exploded view of the component parts of the bolt operating mechanism in accordance with the present invention.

Referring more particularly to the drawings wherein like reference numerals are used for like elements in the various figures thereof, reference numeral 1 denotes the trunnion ring on which the gun is cradled. Barrel 2 contains round 3. Breech ring 4 is affixed to barrel 2 by means of internal thread 5 of breech ring 4 which engages external thread 6 of barrel 2, thereby locking breech ring 4 to barrel 2 for movement therewith during recoil and counterrecoil. Bolt stop ring 8 having inclined surfaces (not shown) and breech ring inserts 9 and 9' are mounted in breech ring 4 by means of screws as is more fully shown and described in the copending application, serial number 159,336, now Patent No. 2,775,920, to Paul H. Dixon and Maynard B. Wallin, entitled "Bolt Spline," filed on May 1, 1950.

The bolt assembly comprising bolt body 10, bolt head 11, firing pin 12, helical spring 13, sleeve 14, insulator ring 15, insulator disc 16, retainer disc 17 and snap ring 18 is identical with and operates in an identical manner as the bolt assembly of the aforementioned copending application. Helical motion by bolt head 11 relative to bolt body 10, which is constricted to longitudinal movement only, is provided by the helical spline connection between bolt body 10 and bolt head 11, which includes several annular grooves interrupting the teeth of the spline connection.

Breech ring 4 includes two longitudinal bores 19 which receive slidably actuator rods 20. Receiver 21 surrounds breech ring 4 and is fastened to trunnion ring 1 by means of a follower 22 threadably engaging trunnion ring 1 as at 23. Similarly casing 24, which houses the recoil and counterrecoil mechanisms (not shown) is fastened to trunnion ring 1 by means of follower 25 threadably engaging trunnion ring 1 as at 26. A plurality of cam-ways 27 are provided on the inside of trunnion ring 1, the general shapes of which are shown in Figure 9 as they would appear on a plane surface. Breech ring 4 has a forward portion 28 of reduced outside diameter, best illustrated in Figures 6 and 10, over which cam follower 29 fits slidably. Twelve lugs 30 project diametrically at equal intervals from cam follower 29, on which are provided twelve rolls 31 which engage the cam-ways 27 in trunnion ring 1.

The inside diameter of cam follower 29 is provided with helical gear 32 which meshes with helical gear 33 provided on the outer surface of actuator racks 34, the outer surfaces of actuator racks 34 following the contour of the inner surface of cam follower 29; in other words, the helical gears 33 on the outer surfaces of actuator racks represent a cylindrical segment of substantially the same diametrical dimension as cam follower 29, only sufficiently smaller to permit proper meshing between helical gears 32 and 33. Actuator racks 34 are provided on the inner surfaces thereof with leg portions 35, which are substantially rectangular in cross section as best illustrated in Figures 2, 3 and 5. Breech ring 4 is provided with two, diametrically opposed T-shaped slots 36, which are substantially identical with the T-shaped outlines of actuator racks 34 and slidably receive the same. Actuator rods 20 are secured to the rearward portion of actuator racks by means of tongue and groove connections 37.

Two breech keys 38 shown in Figure 4 are secured to receiver 21 by means of socket head cap screws 39 positioned by large bushings (not shown). Breech keys 38 slidably engage corresponding key-ways 40 in breech ring 4 shown in Figures 4 and 10 thereby locking breech ring 4 to receiver 21 against rotation caused by the torque of the projectile rotation and of the follower rotation. Receiver 21 itself is held against rotation by means of four dowel pins 41 provided at the rearward end of trunnion ring 1 which engage similarly located holes 42 on the forward end of receiver 21 thereby preventing rotation of receiver 21 ordinarily caused by the torque against breech keys 38.

Cam follower 29 is assembled on the forward end of breech ring 4 and is retained in place by retainer ring 43 shown in Figures 1, 5, 6 and 10. Retaining ring 43 is secured to breech ring 4, and more specifically to the portion 28 of reduced diametrical dimension thereof by means of a plurality of socket head cap screws 44.

*Operation*

After firing a round barrel 2 commences to recoil. Breech ring 4 which is locked to barrel 2 by threads 5 and 6 for axial movement therewith also recoils in unison with barrel 2. Moreover cam follower 29, which is rotatably supported on reduced diameter portion 28 of breech ring 4, moves with breech ring 4 and barrel 2 in recoil since it is locked against axial movement on the one side by the shoulder formed by the reduction in diametric dimension of breech ring 4 and on the other side by retainer ring 43 fastened to the forward end portion 28 of breech ring 4 by means of cap screws 44.

Thus the rolls 31 on the periphery of cam follower 29 follow the path of cam-ways 27 in trunnion ring 1. This causes cam follower 29 to rotate while recoiling, thereby imparting linear movement to actuator racks 34 by means of their helical gear connection 32 and 33. The rearward movement of actuator racks 34 which have a greater linear velocity than the pitch line velocity of cam follower 29, since their velocity consists of the sum of two component velocities, namely the velocity due to the recoil of the breech ring assembly and the component due to the rotation of cam follower 29 converted to linear motion, causes actuator rods 20 to push against the side arms of bolt body 10, thereby unlocking the bolt assembly as described in the aforementioned copending application, Serial Number 159,336, now Patent No. 2,775,920.

The timing of the bolt unlocking is established by the slope of the trunnion ring cam-ways 27. As the cam-ways have zero slope for the first portion $a$ of gun recoil as shown in Figure 9, there is no rotation of cam follower 29 during this period. Consequently this provides for a delay in the start of the bolt unlocking action to allow the pressure in the gun tube chamber to dissipate sufficiently to permit bolt unlocking without critical stresses to the bolt operating mechanism. During the following portion $b$ cam follower 29 rotates, thereby imparting linear motion to actuator rods 20 through actuator racks 34 and helical gear connection 32 and 33 so that bolt unlocking takes place by cam action. During the portion $c$ actuator rods 20 are momentarily decelerated just prior to bolt unlocking while bolt body 10 continues under its own momentum and separates from the actuator rods. This momentum is sufficient to complete bolt unlocking and pick up the bolt head 11 and shell casing as is more fully described in the aforementioned copending application, Serial Number 159,336, now Patent No. 2,775,920, and in the copending application Serial Number 249,276, now Patent No. 2,712,192, to Paul H. Dixon and Maynard B. Wallin, filed on October 2, 1951, entitled "Case Ejection." However this momentum is insufficient to develop severe impact stresses in the bolt mechanism. After unlocking is completed cam follower 29 again accelerates actuator rods 20 during period $d$ which reestablish contact with bolt body 10 and accelerate the bolt assembly. Portion $e$ in cam-ways 27 represents the period after bolt acceleration in normal recoil, whereas portion $f$ indicates the period beyond normal recoil. This cam design thus provides for the completion of bolt unlocking at a time when the residual chamber pressure is not appreciable, thereby assuring complete mechanical control of the bolt during final acceleration.

Reference is also made to the following copending applications which disclose several other features of the automatic cannon utilizing the bolt unlocking mechanism in accordance with the present invention: Serial Number 155,893, now Patent No. 2,746,357, to Paul H. Dixon, filed on April 14, 1950, entitled "Feed Mechanism"; Serial Number 156,574, to Paul H. Dixon and Maynard B. Wallin, filed on April 18, 1950, entitled "Round Rammer"; and Serial Number 249,275, and now abandoned to Paul H. Dixon and Maynard B. Wallin, filed October 2, 1951, entitled "Bolt Buffer."

While I have shown and described only one preferred embodiment of my invention, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

I claim:

1. In combination with a shuttle type bolt assembly including a bolt head and a bolt body, a mechanical bolt unlocking mechanism comprising a trunnion ring having a plurality of helical cam-ways, a breech ring assembly slidably mounted in said trunnion ring and locked to the gun barrel for movement therewith during recoil, a cam follower having internal helical gear means, said cam follower being rotatably supported by said breech ring assembly and locked thereto for movement therewith during recoil, said cam follower engaging said cam-ways thereby producing rotation thereof during recoil as determined by the slope of said cam-ways, a plurality of actuator rods slidably housed within said breech ring assembly, one end of each of said actuator rods bearing against said bolt body, a plurality of actuator racks having external helical gear means for engagement with said internal helical gear means to convert the rotary motion of said cam follower into linear motion of said actuator racks, and means for fastening said actuator rods to said actuator racks for movement therewith to unlock said bolt assembly.

2. The apparatus according to claim 1 wherein said cam-ways have a zero-slope portion to initially delay unlocking of said bolt assembly.

3. The apparatus according to claim 2 wherein said cam-ways further include a portion of decreased slope which temporarily decelerates said actuator rods during bolt unlocking.

4. In combination with an automatic gun having a receiver, a shuttle type bolt assembly in said receiver, a trunnion ring secured to said receiver and a gun barrel, said trunnion ring including a plurality of helical cam-ways, a mechanical bolt unlocking mechanism within said trunnion ring and said receiver comprising a breech ring secured to said barrel for movement therewith during recoil, a cam follower having internal helical gear means rotatably supported by said breech ring and locked thereto for movement therewith during recoil, said cam follower including a plurality of rolls for engagement with said camways to rotate said follower during recoil, a plurality of actuator rods slidably housed within said breech ring and bearing against said bolt assembly at one end thereof, and a plurality of actuator racks slidably supported in said breech ring and secured to the other end of said actuator rods, said actuator racks including external helical gear means engaging said internal helical gear means to convert the rotary motion of said cam follower into linear motion of said actuator racks.

5. The apparatus according to claim 4 wherein said camways form delay-mean for initially delaying bolt unlocking during recoil.

6. The apparatus according to claim 5 wherein said camways further form means for temporarily decelerating said actuator rods during bolt unlocking.

7. In an automatic cannon having a barrel and a shuttle type bolt assembly consisting of a bolt head and a bolt body, a mechanical bolt unlocking mechanism comprising a fixed trunnion ring having a plurality of equiangularly spaced helical camways formed on the interior surface thereof, a breech ring secured to said barrel for motion therewith, a cam follower rotatably supported on said breech ring, a plurality of equiangularly spaced rolls fixed to said cam follower and received within respective camways, a helical gear formed on the inner periphery of said cam follower, a plurality of actuator racks having gear teeth formed thereon to cooperate with the said helical gear and slidably disposed within the said cam follower, and a plurality of connecting rods extending between the said actuator racks and the said bolt body whereby upon recoil of said barrel the said helical camways and the said rolls cooperate to rotate the said cam follower whereupon the said helical gear and actuator rack gear teeth cooperate to impart translation to the said connecting rods to unlock the said bolt head.

8. In an automatic cannon having a barrel and a shuttle type bolt assembly consisting of a bolt head and a bolt body, a mechanical bolt unlocking mechanism comprising a fixed trunnion ring surrounding said barrel, a plurality of equiangularly spaced camways formed on the interior surface of said trunnion ring, a breech ring secured to said barrel for motion therewith, a cam follower rotatably supported on said breech ring, a plurality of equiangularly spaced rolls fixed to said cam follower and received within respective camways, a helical gear formed on the inner surface of said cam follower, a plurality of actuator racks having gear teeth formed thereon, a plurality of longitudinal grooves formed in said breech ring to receive said actuator racks, a plurality of connecting rods extending between respective actuator racks and the said bolt body whereby upon recoil of said barrel the said camways and the said rolls cooperate to rotate the said cam follower, and the said helical gear and actuator rack gear teeth cooperate to translate said actuator racks and connecting rods to unlock the said bolt head.

9. The invention as set forth in claim 8 wherein the said camways are formed parallel to the axis of the said barrel for the first portion of barrel recoil to provide a time delay in the start of bolt unlocking action.

10. The invention as set forth in claim 9 wherein the said camways are formed at a substantial angle to the axis of the said barrel in a second portion thereof to impart rotation to the said cam follower.

11. The invention as set forth in claim 10 wherein the said second portion of said camways has a minor section thereof formed parallel to the axis of the said barrel to momentarily decelerate the said connecting rods immediately prior to bolt unlocking.

References Cited in the file of this patent

UNITED STATES PATENTS

| | | |
|---|---|---|
| 1,007,911 | Bjorgum | Nov. 7, 1911 |
| 1,801,179 | Stange | Apr. 14, 1931 |
| 1,846,156 | Stange | Feb. 23, 1932 |
| 2,267,501 | Holek | Dec. 23, 1941 |
| 2,494,889 | Maillard | Jan. 17, 1950 |

FOREIGN PATENTS

| | | |
|---|---|---|
| 2,105 | Great Britain | A. D. 1915 |
| 253,225 | Great Britain | June 17, 1926 |
| 708,197 | Germany | July 15, 1941 |